(12) United States Patent
Zhao et al.

(10) Patent No.: US 9,964,811 B2
(45) Date of Patent: May 8, 2018

(54) CURVED DISPLAY PANEL AND DISPLAY APPARATUS CONTAINING THE SAME

(71) Applicant: BOE TECHNOLOGY GROUP CO., LTD, Beijing (CN)

(72) Inventors: Weili Zhao, Beijing (CN); Jae Geon You, Beijing (CN); Xinxing Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 15/038,181

(22) PCT Filed: Dec. 10, 2015

(86) PCT No.: PCT/CN2015/096929
§ 371 (c)(1),
(2) Date: May 20, 2016

(87) PCT Pub. No.: WO2016/169277
PCT Pub. Date: Oct. 27, 2016

(65) Prior Publication Data
US 2017/0102568 A1  Apr. 13, 2017

(30) Foreign Application Priority Data

Apr. 20, 2015 (CN) .......................... 2015 1 0187400

(51) Int. Cl.
*G02F 1/1339* (2006.01)
*G02F 1/137* (2006.01)
(Continued)

(52) U.S. Cl.
CPC ............ *G02F 1/1339* (2013.01); *G02F 1/137* (2013.01); *G02F 1/133514* (2013.01);
(Continued)

(58) Field of Classification Search
CPC ...................................... G02F 1/1339
See application file for complete search history.

(56) References Cited

U.S. PATENT DOCUMENTS

2002/0196393 A1* 12/2002 Tashiro ................. G02F 1/1303
349/106
2007/0126969 A1* 6/2007 Kimura ............. G02F 1/133555
349/141
(Continued)

FOREIGN PATENT DOCUMENTS

CN  101563643 A  10/2009
CN  102183858 A  9/2011
(Continued)

OTHER PUBLICATIONS

The World Intellectual Property Organization (WIPO) International Search Report for PCT/CN2015/096929 dated Mar. 14, 2016.
(Continued)

*Primary Examiner* — Sang V Nguyen
(74) *Attorney, Agent, or Firm* — Anova Law Group, PLLC

(57) ABSTRACT

The present disclosure provides a curved display panel. The curved display panel includes two substrates each having a first curvature, each of the two substrates including two first side regions with the first curvature and two second side regions; a sealant for bonding the two substrates together, the sealant having a first sealant portion configured to seal the first side regions and a second sealant portion configured to seal the second side regions, wherein a Young's modulus of the first sealant is less than a Young's modulus of the second sealant.

13 Claims, 3 Drawing Sheets

(51) Int. Cl.
*G02F 1/1335* (2006.01)
*G02F 1/1343* (2006.01)
(52) U.S. Cl.
CPC .. *G02F 1/134309* (2013.01); *G02F 2201/121* (2013.01); *G02F 2201/123* (2013.01); *G02F 2201/56* (2013.01)

(56) References Cited

U.S. PATENT DOCUMENTS

| | | | | |
|---|---|---|---|---|
| 2008/0002137 | A1* | 1/2008 | Kim | G02F 1/1303 349/187 |
| 2009/0066903 | A1* | 3/2009 | Yoshida | G02F 1/1339 349/153 |
| 2011/0228190 | A1* | 9/2011 | Yang | G02F 1/13394 349/56 |
| 2012/0154707 | A1* | 6/2012 | Hsieh | H01L 51/0097 349/60 |
| 2014/0092356 | A1* | 4/2014 | Ahn | G02F 1/1339 349/153 |
| 2016/0054484 | A1* | 2/2016 | Kikuchi | G02B 5/0278 362/330 |

FOREIGN PATENT DOCUMENTS

| | | | |
|---|---|---|---|
| CN | 102902109 A | 1/2013 | |
| CN | 103984155 A | 8/2014 | |
| CN | 104777678 A | 7/2015 | |
| JP | 2009115933 A | 5/2009 | |
| JP | 2012-185457 * | 9/2012 | G09F 9/30 |
| WO | 2012120665 A1 | 9/2012 | |

OTHER PUBLICATIONS

The State Intellectual Property Office of the People's Republic of China (SIPO) Office Action 1 for 201510187400.2 dated Nov. 27, 2015.

The State Intellectual Property Office of the People's Republic of China (SIPO) Office Action 2 for 201510187400.2 dated May 23, 2016.

* cited by examiner

CURVED DISPLAY PANEL AND DISPLAY APPARATUS CONTAINING THE SAME

CROSS-REFERENCES TO RELATED APPLICATIONS

This application is a national phase entry under 35 U.S.C. § 371 of International Application No. PCT/CN2015/096929, filed on Dec. 10, 2015, which claims priority to Chinese Patent Application No. 201510187400.2, filed on Apr. 20, 2015. The above enumerated patent applications are incorporated by reference herein in their entirety.

FIELD OF THE DISCLOSURE

The present disclosure generally relates to the field of display technologies and, more particularly, relates to a curved display panel and a display apparatus containing the same.

BACKGROUND

Display modes of liquid crystal display(LCD) products often include a twisted nematic (TN) mode, a vertical alignment (VA) mode, an in-plane switching (IPS) mode, and an advanced super dimension switching (ADS) mode, or the like. The ADS mode improves the image quality of LCD display products with thin-film transistors (TFTs). The ADS mode also provides advantages such as high resolution, high light transmission rate, low power consumption, wide viewing angles, high aperture ratio, low chromatic aberration, and little or no push Mura. Thus, LCD display products using ADS mode has become popular.

Currently, curved display technologies have been widely used in televisions with large screens and high-end televisions. LCD has become more popular with the development of three-dimensional (3D) technologies. Users focus more on the display quality of the LCD panels. However, in an LCD panel with horizontal orientation as the initial orientation of the liquid crystal modes, i.e., in an LCD display panel using the ADS or the IPS mode, a top substrate and a bottom substrate of the LCD panels may undergo different bending strains when the LCD panel is being bent. The top substrate often undergoes a compressive strain and the bottom substrate often undergoes a tensile strain. As a result, the optical axes of the two substrates often deviate from each other. Severe light leakage in the edge region of the display panels may be caused by the deviation.

Thus, it its desirable to improve or reduce the light leakage in a curved LCD panel with display modes of horizontal initial liquid crystal orientations.

BRIEF SUMMARY OF THE DISCLOSURE

The present disclosure provides a curved display panel and a display apparatus containing the curved display panel, to reduce the dark state light leakage. Dark state light leakage on the sides with the first curvature can be reduced.

One aspect of the present disclosure provides a curved display panel. The curved display panel includes two substrates each having a first curvature, each of the two substrates including two first side regions with the first curvature and two second side regions; a sealant for bonding the two substrates together, the sealant having a first sealant portion configured to seal the first side regions and a second sealant portion configured to seal the second side regions, wherein a Young's modulus of the first sealant is less than a Young's modulus of the second sealant.

Optionally, two ends of each one of the second side regions are connected to the two first side regions such that the two first side regions and the two second regions form a closed structure.

Optionally, the Young's modulus of the first sealant is less than or equal to 1.6 Gpa.

Optionally, the Young's modulus of the first sealant is more than or equal to 0.016 Gpa and less than or equal to 0.16 Gpa.

Optionally, the Young's modulus of the second sealant is about 1 to 10 Gpa.

Optionally, a ratio of the Young's modulus of the second sealant to the Young's modulus of the first sealant is between 1 and 100.

Optionally, a ratio of the Young's modulus of the second sealant to the Young's modulus of the first sealant is between 1 and 10.

Optionally, the two substrates include an array substrate and a color filter substrate; and a liquid crystal layer is formed between the array substrate and the color filter substrate.

Optionally, the array substrate includes one or more pixel electrodes and one or more common electrodes; and an electrical field formed by the pixel electrodes and the common electrodes is configured to control orientations of liquid crystal molecules in the liquid crystal layer.

Optionally, the pixel electrodes and the common electrodes have strip shapes and are arranged in an alternating manner in a same layer.

Optionally, the common electrodes are arranged opposed to the pixel electrodes; and the common electrodes are arranged on a common electrode plane and the pixel electrodes are distributed in parallel on the common electrode plane, two adjacent pixel electrodes being separated by a portion of the common electrode plane.

Optionally, the common electrodes are arranged opposed to the pixel electrodes; and the pixel electrodes are arranged as a pixel electrode plane and the common electrodes are distributed in parallel on the pixel electrode plane, two adjacent common electrodes being separated by a portion of the pixel electrode plane.

Another aspect of the present disclosure provides a display apparatus, including the disclosed curved display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Embodiment 1

Figure 1:
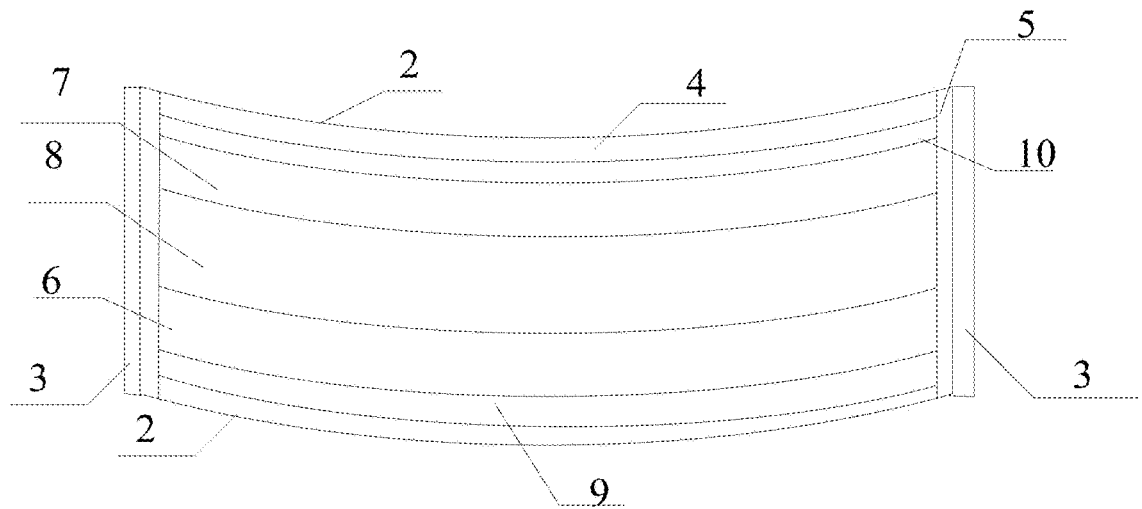
FIG. 1 illustrates a structure of an exemplary curved display panel according to a first embodiment of the present disclosure.

The present disclosure provides a curved display panel. As shown in FIGS. 1 to 6, the curved display panel 1 may be provided. Specifically, as shown in FIG. 1, the curved display panel 1 may include an array substrate 6 and a color filter substrate 7 bonded to each other. A liquid crystal layer 8 may be bonded or formed between the array substrate 6 and the color filter substrate 7.

On the two sides of the bonded array substrate 6 and the color filter substrate 7 facing away from the liquid crystal layer 8, a first polarizer 9 and a second polarizer 10 may be placed. One of the first polarizer 9 and the second polarizer 10 may be arranged on one side and the other one of the first polarizer 9 and the second polarizer 10 may be arranged on the other side. The light polarization direction of the first polarizer 9 and the light polarization direction of the second polarizer 10 may be perpendicular to each other.

The array substrate 6 and the color filter substrate 7 may each include two first side regions 2 and two second side regions 3. Each one of the two first side regions 2 may have a first curvature. The two ends of each one of the two second side regions 3 may be connected or attached to both first side regions 2. The two first side regions 2 and the two second side regions 3 may form a closed structure or closed loop.

It should be noted that, the first side regions 2 and the second side regions 3 may each refer to an area with a certain width on an edge of the array substrate 6 and the color filter substrate 7. The specific value of the width may be adjusted according to different applications/designs.

Figure 2:
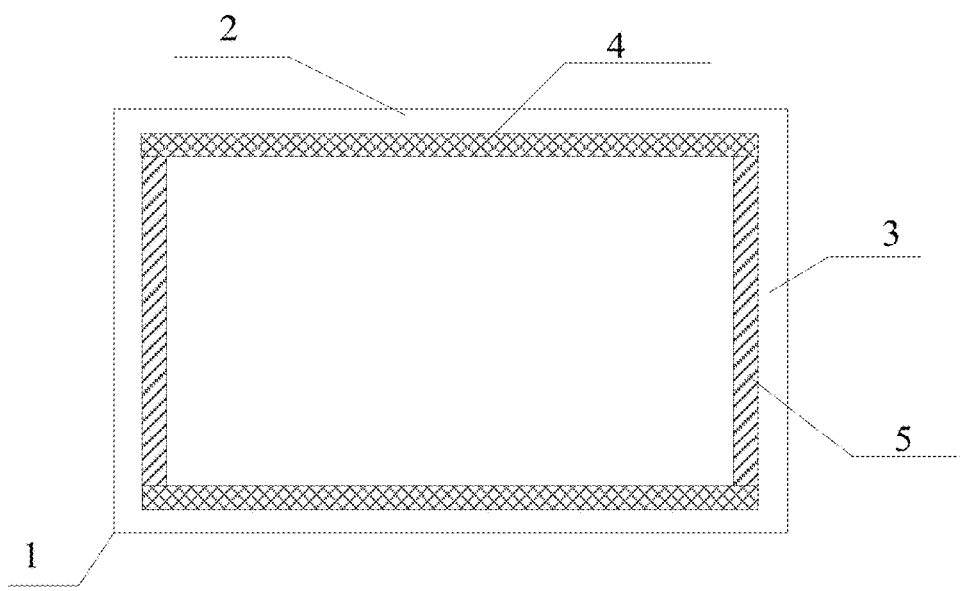
FIG. 2 illustrates a top view of the curved display panel according to the first embodiment of the present disclosure.

As shown in FIG. 2, the curved display panel 1 may include a first sealant 4 between the array substrate 6 and the color filter substrate 7. The first sealant 4 may be used to seal the first side regions 2 of the array substrate 6 and the color filter substrate 7. The curved display panel 1 may further include a second sealant 5 formed between the array substrate 6 and the color filter substrate 7. The second sealant 5 may be used to seal the second side regions 3 of the array substrate 6 and the color filter substrate 7. The Young's modulus of the first sealant 4 may be less than the Young's modulus of the second sealant 5.

In the disclosed curved display panel 1, because Young's modulus of the first sealant 4, configured to seal the first side regions 2, may be less than the Young's modulus of the second sealant 5, configured to seal the second side regions 3, the first sealant 4 may have higher flexibility and may effectively reduce the dark state light leakage in the first side regions 2 and areas close to the first side regions 2 of the curved display panel 1. In some embodiments, the Young's modulus of the second sealant may be about 1 to 10 Gpa.

It has been noted that, a sealant with a larger Young's modulus may provide more desirable sealing performance but may not effectively prevent dark state light leakage. A sealant with a smaller Young's modulus may not provide desired sealing performance but may more effectively prevent dark state light leakage.

As shown in FIG. 2, the dark state light leakage on the edges of the curved display panel 1 may mostly be distributed on the first side regions 2, with the first curvature, of the curved display panel 1. Thus, a sealant with a smaller Young's modulus may be applied on the first side regions 2 of the curved display panel 1 to more effectively prevent dark state light leakage. A sealant with a larger Young's modulus may be used for the second side regions 3 of the curved display panel 1 to provide a desirable bonding.

Thus, the second sealant 5, with a larger Young's modulus, may be applied on the second side regions 3 to provide sealing. The first sealant 4, with a smaller Young's modulus, may be applied on the first side regions 2 to provide sealing. Thus, the sealing performance on the second side regions 3 may be ensured and the dark state light leakage on the first sides 2 may be reduced.

In some embodiments, the Young's modulus of the first sealant 4 may be less than 1.6 Gpa.

It has been noted from experiments that, a first sealant 4 with a smaller Young's modulus may provide reduction of dark state light leakage.

In some embodiments, the Young's modulus of the first sealant 4 may range between 0.016 Gpa and 0.16 Gpa. It should be noted that, although a smaller Young's modulus may reduce dark state light leakage, the first sealant 4 with an overly low Young's modulus may impair the sealing performance of the first sealant layer 4. In some embodiments, the Young's modulus of the second sealant 5 may be 1.6 Gpa. A second sealant 5 with a larger Young's modulus may better ensure the sealing performance on the second side regions 3.

In some embodiments, the second sealant 5 may also have a smaller Young's modulus for sealing the second side regions 3.

In some embodiments, a ratio of the Young's modulus of the second sealant 5 to the Young's modulus of the first sealant 4 may be between 1 and 100. It should be noted that, to ensure a more desirable sealing performance of the second side regions 3, the Young's modulus of the second sealant 5 may be as large as possible within the reasonable range.

Meanwhile, the Young's modulus of the first sealant 4 may be chosen based on the Young's modulus of the second sealant 5. It should be noted that, if the ratio of the Young's modulus of the second sealant 5 to the Young's modulus of the first sealant 4 is overly high, the Young's modulus of the first sealant 4 may be too small, which represents an overly flexible first sealant 4. The sealing performance of the curved display panel 1 may be impaired.

In some embodiments, the ratio of the Young's modulus of the second sealant 5 to the Young's modulus of the first sealant 4 may be between 1 and 10.

It should be noted that, to ensure the sealing performance of the second side regions 3, the Young's modulus of the second sealant 5 may as large as possible within the reasonable range. In this case, the dark state light leakage on the first side regions 2 may be reduced. The risk of the liquid crystal leaking out the curved display panel 1 due to an overly small Young's modulus of the first sealant 4 may also be reduced.

In some embodiments, the array substrate may include one or more pixel electrodes and one or more common electrodes. The electrical field formed by the pixel electrodes and the common electrodes may be used to control the orientation or turning direction of the crystal liquid molecules.

The pixel electrodes and the common electrodes may have strip shapes. The pixel electrodes and the common electrodes may be arranged in an alternating manner in a same layer. For example, one pixel electrode may be arranged between two common electrodes and vice versa. In other words, the curved display panel 1 may be an ADS curved display panel.

In some embodiments, the array substrate may include one or more pixel electrodes and one or more common electrodes. The electrical field formed by the pixel electrodes and the common electrodes may be used to control the turning direction or orientation of the liquid crystal molecules. A pixel electrode and a common electrode may be arranged opposing each other. The common electrodes may have strip shapes. The pixel electrode may be distributed as a pixel electrode plane on the curved display panel 1. The common electrodes may be arranged on the pixel electrode plane, parallel to each other and having strip shapes. Two adjacent common electrodes may be separated by a portion of the pixel electrode plane. Alternatively, the common electrode may be distributed as a common electrode plane on the curved display panel 1. The pixel electrodes may be arranged on the common electrode plane, parallel to each other and having strip shapes. Two adjacent pixel electrodes may be separated by a portion of the common electrode plane. In other words, the curved display panel 1 may be an IPS curved display panel.

In the bending process to form the ADS curved display panel and the IPS curved display panel, dark state light leakage may still occur in the first side regions 2 of the curved display panel. Using the first sealant 4 in the first side regions 2, the first sealant 4 having a smaller Young's modulus than the Young's modulus of the second sealant layer 5 used for the second side regions 3, dark state light leakage on the first side regions 2 may be effectively reduced.

Specifically, software simulations have been used to calculate the dark state light leakage of the curved display panel 1. It should be noted that, because the first side regions 2 may be bent and may have the most dark state light leakage, the arrangement or designs of the first sealant 4 and the second sealant 5 of the present disclosure can reduce the dark state light leakage.

The condition and the result of experiment one may be used as a base for comparison. Experiment two and experiment three were simulated using modified conditions of experiment one. The change of the conditions of experiment one may include changing the Young's modulus of the first sealant 4.

Experiment One

Figure 3:
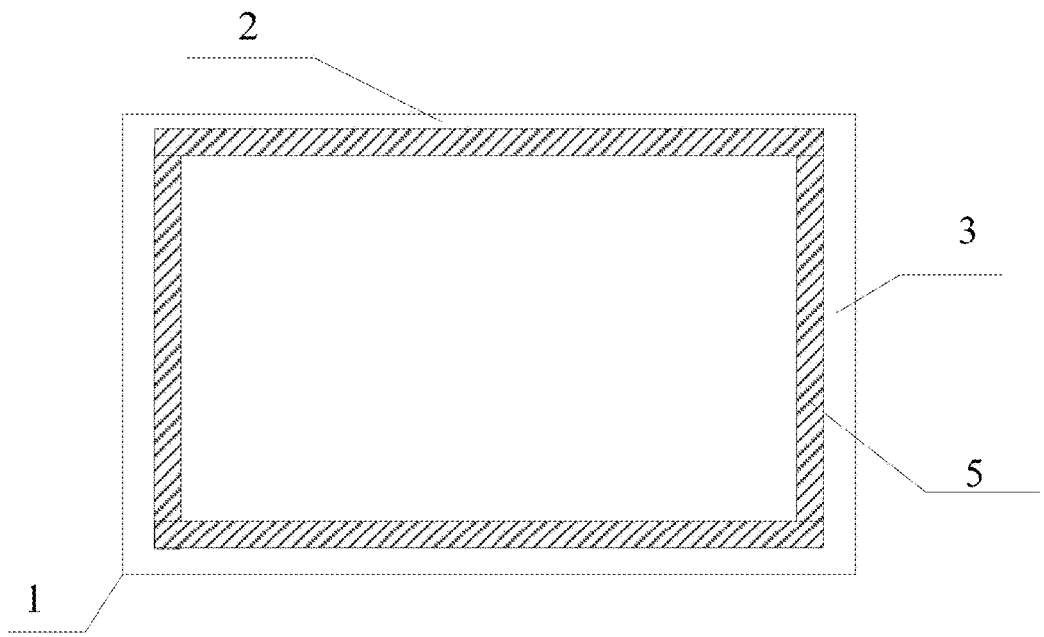
FIG. 3 illustrates a top view of a first simulated curved display panel according to the first embodiment of the present disclosure.

As shown in FIG. 3, the curved display panel 1 may include the two substrates with a first curvature. The two substrates may be bonded together. The two substrates may each include two first side regions 2 with the first curvature. The two substrates may also include two second side regions 3. The two ends of each second side region 3 may be connected to the two first side regions 2. The two first side regions 2 and the two second side regions 3 may form a closed structure or closed loop.

The curved display panel 1 may also include a second sealant 5 formed between the two substrates. The second sealant 5 may be used to seal the first side regions 2 and the second side regions 3 of the two substrates.

When the second sealant 5, with a young's modulus of 1.6 Gpa, is applied on the first side regions 2 and the second side regions 3 of the curved display panel 1, an experiment of the curved display panel 1, with a Young's modulus of 1.6 Gpa, may be performed. The dark state light leakage of the curved display panel may be simulated with the side regions sealed by the sealant with a Young's modulus of 1.6 Gpa.

The experiment for an 18.5" ADS curved display panel 1 may be performed. The optical phase retardation of the liquid crystal layer 8 may be about $\Delta nd=348$ nm. The effective display area may be about 410×230 mm. The sealant may each have a width of about 1 mm. The substrate may each have a thickness of about 0.5 mm. The radius of curvature of the substrates may be about 2000 mm.

Figure 4:
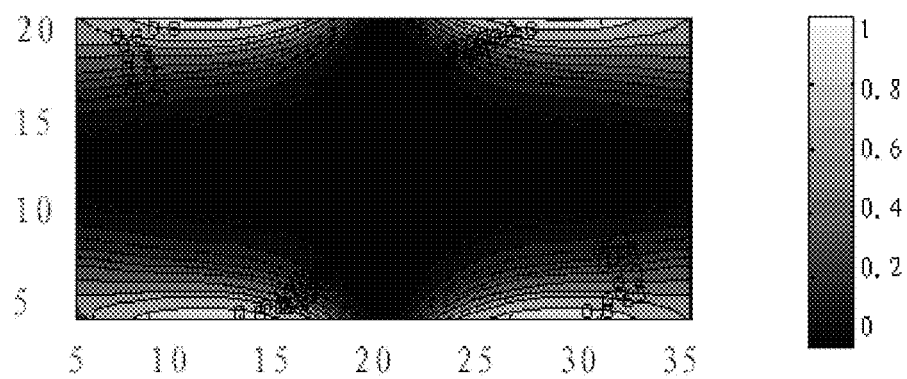
FIG. 4 illustrates an experimental image of the dark state light leakage of the first simulated curved display panel according to the first embodiment of the present disclosure.

The four side regions in FIG. 4 may correspond to the first side regions 2 and the second side regions 3 of the curved display panel 1. The lengths of the four side regions in FIG. 4 may be proportional to the first side regions 2 and the second side regions 3 in the curved display panel 1. The markings in FIG. 4 may correspond to the lengths or dimensions on the first side region 2 and the second side region 3.

The right side of FIG. 4 illustrates a scale bar representing different transmission rate in the experiment. For example, an 80% transmission rate may be represented by 0.8.

After simulated by ANSYS, strains may be converted to phase retardation. The dark state light leakage may be calculated using the phase retardation and Jones matrices. FIG. 4 illustrates the positions of the dark state light leakage and the amplitude of transmittance rate in the curved display panel 1. The four corners of the first side regions 2 in the curved display panel 1 may have the most dark state light leakage. The dark state light leakage may be 0.6% according to the results of software simulation. The dark state light leakage may be calculated using the brightness level when the curved display panel 1 is in bright state, as the reference. The brightness of the curved display panel 1 at bright state may be 300 nit, for example. Thus, the dark state light leakage may be 300×0.6%=1.8 nit.

Experiment Two

As shown in FIG. 2, the second sealant 5, with a Young's modulus of 1.6 Gpa, may be used to seal the second side regions 3 of the curved display panel 1. The first sealant 4, with a Young's modulus of 0.16 Gpa, may be used to seal the first side regions 2 of the curved display panel 1. Other parameters may be the same as in embodiment 1.

Other conditions or parameters may include the follows. The curved display panel may be an 18.5" ADS curved display panel 1. The optical phase retardation of the liquid crystal layer 8 may be about $\Delta nd=348$ nm. The effective display area may be about 410×230 mm. The sealant may each have a width of about 1 mm. The substrate may each have a thickness of about 0.5 mm. The radius of curvature of the substrates may be about 2000 mm.

Figure 5:
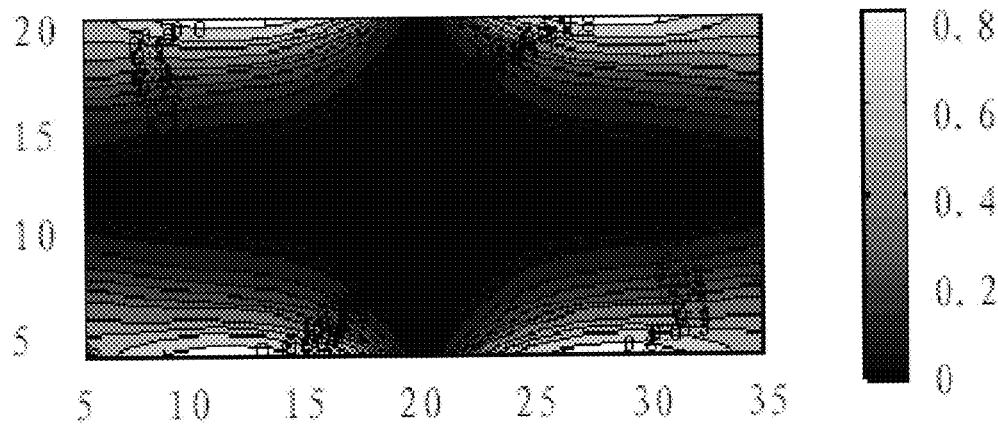
FIG. 5 illustrates an experimental image of the dark state light leakage of the second simulated curved display panel according to the first embodiment of the present disclosure.

The four side regions in FIG. 5 may correspond to the first side regions 2 and the second side regions 3 of the curved display panel 1. The lengths of the four side regions in FIG. 5 may be proportional to the first side regions 2 and the second side regions 3 in the curved display panel 1. The markings in FIG. 5 may correspond to the lengths or dimensions on the first side region 2 and the second side region 3.

The right side of FIG. 5 illustrates a scale bar representing different transmission rate in the experiment. For example, an 80% transmission rate may be represented by 0.8.

After simulated by ANSYS, strains may be converted to a phase retardation. The dark state light leakage may be calculated using the phase retardation and Jones matrices. FIG. 5 illustrates the positions of the dark state light leakage and the amplitude of transmittance rate in the curved display panel 1. The dark state light leakage may be 0.48% according to the results of software simulation. The dark state light leakage may be calculated using the brightness level when the curved display panel 1 is in bright state, as the reference. The brightness of the curved display panel 1 at bright state may be 300 nit. Thus, the dark state light leakage may be 300×0.48%=1.44 nit. The simulated dark state light leakage in embodiment 2 may be 20% lower than the simulated dark state light leakage in embodiment 1. Thus, the dark state light leakage of the curved display panel may be effectively reduced.

Experiment Three

Figure 6:
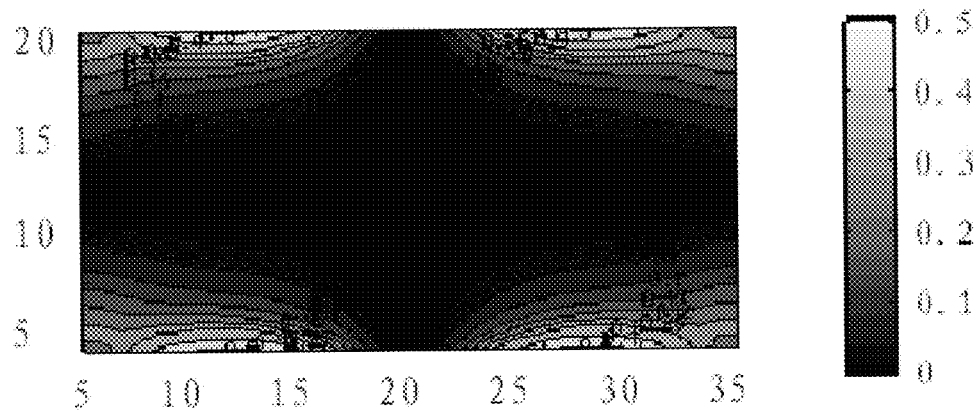
FIG. 6 illustrates an experimental image of the dark state light leakage of the third simulated curved display panel in the first embodiment of the present disclosure.

As shown in FIG. 6, the second sealant 5, with a Young's modulus of 1.6 Gpa, may be used to seal the second side regions 3 of the curved display panel 1. The first sealant 4, with a Young's modulus of 0.016 Gpa, may be used to seal the first side regions 2 of the curved display panel 1. Other parameters may be the same as in embodiment 1.

Other conditions or parameters may include the follows. The curved display panel may be an 18.5" ADS curved display panel 1. The optical phase retardation of the liquid crystal layer 8 may be about Δnd=348 nm. The effective display area may be about 410×230 mm. The sealant may each have a width of about 1 mm. The substrate may each have a thickness of about 0.5 mm. The radius of curvature of the substrates may be about 2000 mm.

The four side regions in FIG. 6 may correspond to the first side regions 2 and the second side regions 3 of the curved display panel 1. The lengths of the four side regions in FIG. 6 may be proportional to the first side regions 2 and the second side regions 3 in the curved display panel 1. The markings in FIG. 6 may correspond to the lengths or dimensions on the first side region 2 and the second side region 3.

The right side of FIG. 6 illustrates a scale bar representing different transmission rate in the experiment. For example, an 80% transmission rate may be represented by 0.8.

After simulated by ANSYS, strains may be converted to a phase retardation. The dark state light leakage may be calculated using the phase retardation and Jones matrices. FIG. 6 illustrates the positions of the dark state light leakage and the amplitude of transmittance rate in the curved display panel 1. The dark state light leakage may be 0.3% according to the results of software simulation. The dark state light leakage may be calculated using the brightness when the curved display panel 1 is in bright state, as the reference. The brightness level of the curved display panel 1 at bright state may be 300 nit. Thus, the dark state light leakage may be 300×0.3%=0.9 nit. The simulated dark state light leakage in embodiment 2 may be 50% lower than the simulated dark state light leakage in embodiment 1. Thus, the dark state light leakage of the curved display panel may be effectively reduced.

The dark state light leakage under different conditions can be summarized in Table 1 below.

| | Items | | | |
|---|---|---|---|---|
| Experiments | Young's modulus of the first sealant | Young's modulus of the second sealant | Dark state light leakage | Reduction of the dark state light leakage compared with experiment one |
| Experiment One | 1.6 Gpa | 1.6 Gpa | 1.8 nit | — |
| Experiment Two | 0.16 Gpa | 1.6 Gpa | 1.44 nit | 20% |
| Experiment Three | 0.016 Gpa | 1.6 Gpa | 0.9 nit | 50% |

It can be shown that using the first sealant 4 with a smaller Young's modulus in the curved display panel 1 may effectively reduce the dark state light leakage. In certain embodiments, a Young's modulus of about 10 Mpa may be used for the first sealant. With all other parameters remain the same, the dark state light leakage may be reduced to ⅙ compared to the dark state light leakage in experiment one.

Embodiment 2

The present disclosure provides a display apparatus. The display apparatus may include one or more of the disclosed curved display panel. The display apparatus according to the embodiments of the present disclosure can be used in any product with display functions such as a television, an electronic paper, a digital photo frame, a mobile phone, a tablet computer, and a navigation device.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A curved display panel, comprising:
   two substrates each having a first curvature, each of the two substrates including two first side regions with the first curvature, and two second side regions; and
   a sealant structure for bonding the two substrates together, the sealant structure including a first sealant configured to seal the first side regions, and a second sealant configured to seal the second side regions,
   wherein:
   a Young's modulus of the first sealant is less than a Young's modulus of the second sealant, and
   a ratio of the Young's modulus of the second sealant to the Young's modulus of the first sealant is between 1 and 100.

2. The curved display panel according to claim 1, wherein two ends of each one of the second side regions are connected to the two first side regions such that the two first side regions and the two second regions form a closed structure.

3. The curved display panel according to claim 1, wherein:
   the Young's modulus of the first sealant is less than or equal to 1.6 Gpa.

4. The curved display panel according to claim 3, wherein:
   the Young's modulus of the first sealant is more than or equal to 0.016 Gpa and less than or equal to 0.16 Gpa.

5. The curved display panel according to claim 1, wherein:
   the Young's modulus of the second sealant is about 1 to 10 Gpa.

6. The curved display panel according to claim 1, wherein:
 a ratio of the Young's modulus of the second sealant to the Young's modulus of the first sealant is between 1 and 10.

7. The curved display panel according to claim 1, wherein:
 the two substrates include an array substrate and a color filter substrate; and
 a liquid crystal layer is formed between the array substrate and the color filter substrate.

8. The curved display panel according to claim 7, wherein:
 the array substrate includes one or more pixel electrodes and one or more common electrodes; and
 an electrical field formed by the pixel electrodes and the common electrodes is configured to control orientations of liquid crystal molecules in the liquid crystal layer.

9. The curved display panel according to claim 8, wherein the pixel electrodes and the common electrodes have strip shapes and are arranged in an alternating manner in a same layer.

10. The curved display panel according to claim 8, wherein:
 the common electrodes are arranged opposed to the pixel electrodes; and
 the common electrodes are arranged on a common electrode plane and the pixel electrodes are distributed in parallel on the common electrode plane, two adjacent pixel electrodes being separated by a portion of the common electrode plane.

11. The curved display panel according to claim 8, wherein:
 the common electrodes are arranged opposed to the pixel electrodes; and
 the pixel electrodes are arranged as a pixel electrode plane and the common electrodes are distributed in parallel on the pixel electrode plane, two adjacent common electrodes being separated by a portion of the pixel electrode plane.

12. A display apparatus, including the curved display panel according to claim 1.

13. A curved display panel according to claim 1, further comprising a liquid crystal layer interposed between the two substrates, wherein:
 a portion of the first sealant is arranged over a surface of one of the two substrates that is distant from the liquid crystal layer, and
 another portion of the first sealant is arranged over a surface of the other one of the two substrates that is distant from the liquid crystal layer.

* * * * *